United States Patent [19]

Mori et al.

[11] Patent Number: 4,947,326
[45] Date of Patent: Aug. 7, 1990

[54] REAR WHEEL STEER ANGLE CONTROL SYSTEM FOR VEHICLE

[75] Inventors: Kazunori Mori, Ebina; Namio Irie, Yokohama, both of Japan

[73] Assignee: Nissan Motor Co., Ltd., Yokohama, Japan

[21] Appl. No.: 277,745

[22] Filed: Nov. 30, 1988

[30] Foreign Application Priority Data

Nov. 30, 1987 [JP] Japan .................................. 62-299892
Dec. 28, 1987 [JP] Japan .................................. 62-330283
Dec. 28, 1987 [JP] Japan .................................. 62-330282

[51] Int. Cl.$^5$ .............................................. B62D 5/06
[52] U.S. Cl. .............................. 364/424.05; 180/142; 280/91
[58] Field of Search ................... 364/424.05; 180/140, 180/141, 142; 280/91

[56] References Cited

U.S. PATENT DOCUMENTS

| 4,441,572 | 4/1984 | Ito et al. | 180/140 |
| 4,666,013 | 5/1987 | Shibahata et al. | 180/141 |
| 4,679,809 | 7/1987 | Ito et al. | 280/91 |
| 4,706,979 | 11/1987 | Kawabe et al. | 280/91 |
| 4,720,790 | 1/1988 | Miki et al. | 364/424.05 |
| 4,768,602 | 9/1988 | Inoue et al. | 180/140 |
| 4,770,265 | 9/1988 | Allen | 180/140 |
| 4,781,262 | 11/1988 | Nakamura et al. | 180/140 |
| 4,828,064 | 5/1989 | Furutani et al. | 180/140 |

OTHER PUBLICATIONS

K. Tanaka et al., "Mazda Vehicle Speed Sensing Type Four Wheel Steering".

Primary Examiner—Thomas G. Black
Attorney, Agent, or Firm—Foley & Lardner, Schwartz, Jeffery, Schwaab, Mack, Blumenthal & Evans

[57] ABSTRACT

A rear wheel steer angle control system for a vehicle includes a vehicle speed sensor, a steering wheel angle sensor and a controller for controlling a rear wheel steer angle $\delta_r(s)$ with respect to a front wheel steer angle $\delta_f(s)$ in accordance with $\delta_r(s)/\delta_f(s)=(K+T1s)/(1+T2s)$, where K, T1 and T2 are control parameters each of which is a function of the vehicle speed, and includes a quantity representing a distance of a zero sideslip angle position from a center of gravity of the vehicle. The quantity representing the distance of the zero sideslip angle position at which the sideslip angle is to be zero, may be fixed at a constant value, or may be adjusted in accordance with any one or more of the vehicle speed, the steering wheel angle and the time rate of change of the steering wheel angle.

12 Claims, 10 Drawing Sheets

REAR WHEEL STEER ANGLE CONTROL SYSTEM FOR VEHICLE

BACKGROUND OF THE INVENTION

The present invention relates to a vehicle control system for controlling a rear wheel steer angle of a vehicle.

A conventional rear wheel steer angle control system is disclosed in Tanaka et al. "Mazda Shasoku Kannougata Yonrinsoda," (Mazda vehicle speed sensing type four wheel steering) 4WS (Yonrinsoda) sha: Active Seigyo Gijutsu no Saizensen, Symposium, Society of Automotive Engineers of JAPAN, 1987. In this conventional system, however, a ratio of a rear wheel steer angle to a front wheel steer angle is constant provided that the vehicle speed is constant. Therefore, this conventional system can improve the vehicle stability in a steady state turning motion, but the improvements in vehicle response characteristic are insufficient especially in an abrupt steering operation as in an emergency, and in a dynamic steering operation as in a traVel along slalom course.

SUMMARY OF THE INVENTION

It is an object of the present invention to further improve vehicle response characteristics.

According to the present invention, a rear wheel steer angle control system for a vehicle comprises actuating means 101, steering angle sensing means 102, vehicle speed sensing means 103 and controlling means 104, as schematically shown in FIG. 12.

The actuating means 101 is means for steering rear wheels of the vehicle in response to a control signal representing a rear wheel steer angle. The steering angle sensing means is means for determining a front wheel steer angle by sensing a position of a predetermined element of a front wheel steering system. For example, the steering angle sensing means is means for sensing a steering wheel angle of the vehicle. The vehicle speed sensing means is means for sensing a vehicle speed of the vehicle.

The controlling means is connected with the steering angle sensing means and the vehicle speed sensing means, and arranged to control a ratio of a rear wheel steer angle $\delta_r(s)$ to a front wheel steer angle $\delta_f(s)$ by producing the control signal according to an equation expressed as;

$$\frac{\delta_r(s)}{\delta_f(s)} = \frac{K + T1 \cdot s}{1 + T2 \cdot s}$$

where s is a complex variable generally called the complex frequency and sometimes called the Laplace operator, K, T1 and T2 are first, second and third control parameters given by;

$$K = \frac{C_1 \{aMV^2 + C_2 l_0(l_3 - b)\}}{C_2 \{bMV^2 + C_1 l_0(l_3 + a)\}}$$

$$T1 = \frac{C_1 V(aMl_3 - I)}{C_2 \{bMV^2 + C_1 l_0(l_3 + a)\}}$$

-continued $$T2 = \frac{V(bMl_3 + I)}{bMV^2 + C_1 l_0(l_3 + a)}$$

M is a vehicle mass,
I is a yawing moment of inertia,
$l_0$ is a wheelbase,
a is a first distance between a center of gravity of the vehicle and a front wheel axle,
b is a second distance between said center of gravity and a rear wheel axle,
$l_3$ is a third distance which is a quantity representing a distance between the center of gravity and a zero sideslip angle position at which a vehicle sideslip angle is zero, and which is positive when the zero sideslip angle position is closer to the rear wheel position than the center of gravity,
$C_1$ is a constant representing front wheel cornering power (of left and right wheels),
$C_2$ is a constant representing rear wheel cornering power (of left and right wheels), and
V is the vehicle speed.

The control system of the invention is arranged to determine the rear wheel steer angle by using the transfer function $\delta_r(s)/\delta_f(s)$ which is in the form of a fraction whose numerator and denominator are both of a first order. Therefore, the control system can further improve the vehicle steering response characteristics. Furthermore, the control system of the invention makes it possible to freely adjust the vehicle characteristics by changing the value of the third distance $l_3$ of the zero sideslip angle position from the center of gravity.

The third distance $l_3$ may be limited within the range in which $l_3$ is equal to or greater than $-a$ and $l_3$ is equal to or smaller than b.

As shown in FIG. 12, the controlling means 104 may comprise a main section 104a for determining the rear wheel steer angle by using the transfer function, and a parameter determining section 104 for determining a value of at least one parameter appearing in the transfer function to specify the transfer characteristic. The parameter determining section may be arranged to determine values of the first, second and third control parameters K, T1 and T2, corresponding to a current value of the vehicle speed, by treating the third distance $l_3$ as a constant, or as a function of the vehicle speed or as a function of at least one of the steering wheel angle and a time rate of change of the steering wheel angle. The controlling means 104 may further comprise a differentiating section 104c for determining the time rate of change of the steering wheel angle.

DETAILED DESCRIPTION OF THE INVENTION

Figure 1:
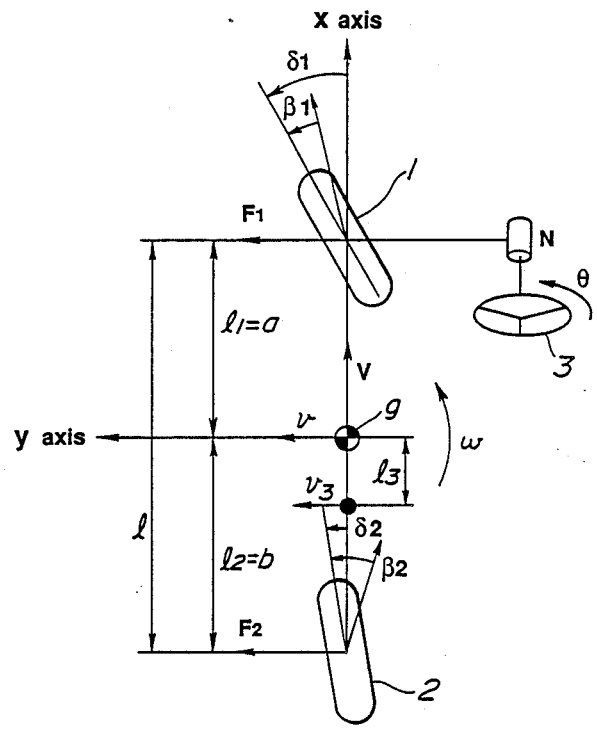
FIG. 1 is a plan view of a simplified vehicle model for illustrating quantities used in the present invention.

FIG. 1 is a plan view of a simplified vehicle model for illustrating the present invention. The vehicle model has a front wheel 1, a rear wheel 2 and a steering wheel 3. The center of gravity of the vehicle lies at a point g.

In FIG. 1, various vehicle constants and motion variables are denoted by the following reference letters.

M: a vehicle mass
I: a yawing moment of inertia
$l_0$: a wheelbase
a: a distance between the center of gravity g of the vehicle and the center of the front wheel 1
b: a distance between the center of gravity g of the vehicle and the center of the rear wheel 2
$l_3$: a distance between the center of gravity g of the vehicle, and a point of the vehicle at which a side slip angle of the vehicle body is zero (The distance $l_3$ is plus when measured from the center of gravity g toward the rear wheel 2.)
$F_1$: a front wheel side force (for two wheels)
$F_2$: a rear wheel side force (for two wheels)
$C_1$: a constant representing front wheel cornering power (for two wheels)
$C_2$: a constant representing rear wheel cornering force (for two wheels)
$\beta_1$: a front wheel slip angle
$\beta_2$: a rear wheel slip angle
V: a vehicle velocity
v: a vehicle side velocity
w: a vehicle yaw rate
N: a steering gear ratio In the linear two-degree-of-freedom model shown in FIG. 1, equations of vehicle motion are expresed, by using Laplace transforms, as;

$$M(sv + Vw) = F_1 + F_2 \quad (1)$$

$$Isw = aF_1 - bF_2 \quad (2)$$

In these equations of motion;

$$F_1 = C_1 \beta_1 \quad (3)$$

$$F_2 = C_2 \beta_2 \quad (4)$$

$$\beta_1 = \delta_1 - \frac{v + aw}{V} \quad (5)$$

$$\beta_2 = \delta_2 - \frac{v - bw}{V} \quad (6)$$

In the equations (5) and (6), $\delta_1$ is a front wheel steer angle, and equal to a steering wheel angle $\theta$ divided by the steering gear ratio N ($\delta_1 = \theta/N$), and $\delta_2$ is a rear wheel steer angle.

As shown in FIG. 1, $v_3$ is a side velocity at a point which is a distance $l_3$ apart from the center of gravity g, in the direction toward the rear wheel 2, and the side velocity $v_3$ is given by;

$$v_3 = v - l_3 w \quad (7)$$

In the present invention, a rear wheel steer control characteristic is determined so as to make the side velocity $v_3$ at the distance $l_3$, equal to zero.
From $v_3 = 0$;

$$v = l_3 w \quad (8)$$

By substituting the equation (8) into the equations (1)-(6), we obtain;

$$Ml_3 sw + MVw = F_1 + F_2$$

$$Isw = aF_1 - bF_2$$

$$F_1 = C_1 \left\{ \delta_1 - \frac{w}{V}(a + l_3) \right\}$$

$$F_2 = C_2 \left\{ \delta_2 - \frac{w}{V}(l_3 - b) \right\}$$

From these equations, we can obtain a transfer function G(s) for determining the rear wheel steer angle $\delta_2(s)$ in accordance with the front wheel steer angle $\delta_1(s)$. (That is, $\delta_2(s) = G(s)\delta_1(s)$)

$$Mw(l_3 s + V) = C_1 \left\{ \delta_1 - \frac{w}{V}(a + l_3) \right\} +$$

$$C_2 \left\{ \delta_1 G - \frac{w}{V}(l_3 - b) \right\}$$

$$Isw = aC_1 \left\{ \delta_1 - \frac{w}{V}(a + l_3) \right\} - bC_2 \left\{ \delta_1 G - \frac{w}{V}(l_3 - b) \right\}$$

Rearrangement of these equations yields;

$$\left\{ M(l_3 s + V) + \frac{C_1(a + l_3) + C_2(l_3 - b)}{V} \right\} w = (C_1 + C_2 G)\delta_1$$

$$\left\{ Is + \frac{aC_1(a + l_3) + bC_2(l_3 - b)}{V} \right\} w = (aC_1 - bC_2 G)\delta_1$$

By using the letters A and B, respectively, for the quantities in the braces in the above equations, we rewrite the equations as;

$$Aw = (C_1 + C_2 G)\delta_1$$

$$Bw = (aC_1 - bC_2 G)\delta_1$$

Therefore, G is obtained as follows:

$$(aC_1 - bC_2 G)A = (C_1 + C_2 G)B \therefore G = \frac{aC_1 A - C_1 B}{bC_2 A + C_2 B}$$

The numerator of $G = aC_1 A - C_1 B =$ $$aC_1 \left\{ M(l_3 s + V) + \frac{C_1(a + l_3) + C_2(l_3 - b)}{V} \right\} -$$

$$C_1 \left\{ Is + \frac{aC_1(a + l_3) - bC_2(l_3 - b)}{V} \right\} =$$

$$C_1 \left\{ (Mal_3 - I)s + MVa + \frac{C_2 l_0(l_3 - b)}{V} \right\}$$

The denominator of $G = bC_2 A + C_2 B =$ $$bC_2 \left\{ M(l_3 s + V) + \frac{C_1(a + l_3) + C_2(l_3 - b)}{V} \right\} +$$

$$C_2 \left\{ Is + \frac{aC_1(a + l_3) - bC_2(l_3 - b)}{V} \right\} =$$

$$C_2 \left\{ (Mbl_3 + I)s + MVb + \frac{C_1 l_0(a + l_3)}{V} \right\}$$

Therefore, $$G(s) = \frac{C_1\{(Mal_3 - I)Vs + MV^2 a + C_2 l_0(l_3 - b)\}}{C_2\{(Mbl_3 + I)Vs + MV^2 b + C_1 l_0(a + l_3)\}} \quad (9)$$

A characteristic of the yaw rate with respect to the steering wheel angle is;

$$\frac{w}{\theta} = \frac{1}{N} \cdot \frac{w}{\delta_1} \quad (10)$$

$$= \frac{1}{N} \cdot \frac{C_1 + C_2 G}{M(l_3 s + V) + \frac{C_1(a + l_3) + C_2(l_3 - b)}{V}}$$

$$= \frac{1}{N} \cdot \frac{C_1 + C_2 \cdot \frac{C_1\{(Mal_3 - I)Vs + MV^2 a + C_2 l_0(l_3 - b)\}}{C_2\{(Mbl_3 + I)Vs + MV^2 b + C_1 l_0(a + l_3)\}}}{M(l_3 s + V) + \frac{C_1(a + l_3) + C_2(l_3 - b)}{V}}$$

$$= \frac{VC_1 l_0}{N\{(Mbl_3 + I)Vs + MV^2 b + C_1 l_0(a + l_3)\}}$$

It is convenient to use the sings K, T1 and T2, as follows;

$$K = \frac{C_1\{MV^2 a + C_2 l_0(l_3 - b)\}}{C_2\{MV^2 b + C_1 l_0(a + l_3)\}}$$

$$T1 = \frac{C_1 V(Mal_3 - I)}{C_2\{MV^2 b + C_1 l_0(a + l_3)\}}$$

$$T2 = \frac{V(Mbl_3 + I)}{MV^2 b + C_1 l_0(a + l_3)}$$

By using K, T1 and T2, the equation (9) is rewritten as;

$$\frac{\delta_2(s)}{\delta_1(s)} = \frac{K + T1 \cdot s}{1 + T2 \cdot s} \quad (11)$$

Therefore, the control system of the present invention is arranged to control the rear wheel steer angle in accordance with the following equation.

$$\frac{\delta_r(s)}{\delta_f(s)} = \frac{K + T1 \cdot s}{1 + T2 \cdot s}$$

Figure 3:
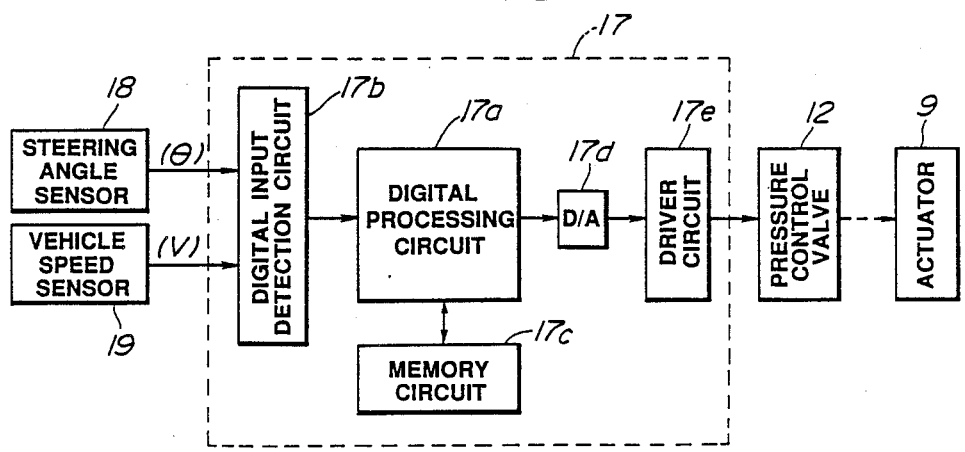
FIG. 3 is a block diagram of a rear wheel steer angle control system for showing the first, second and third embodiments of the invention.
Figure 2:
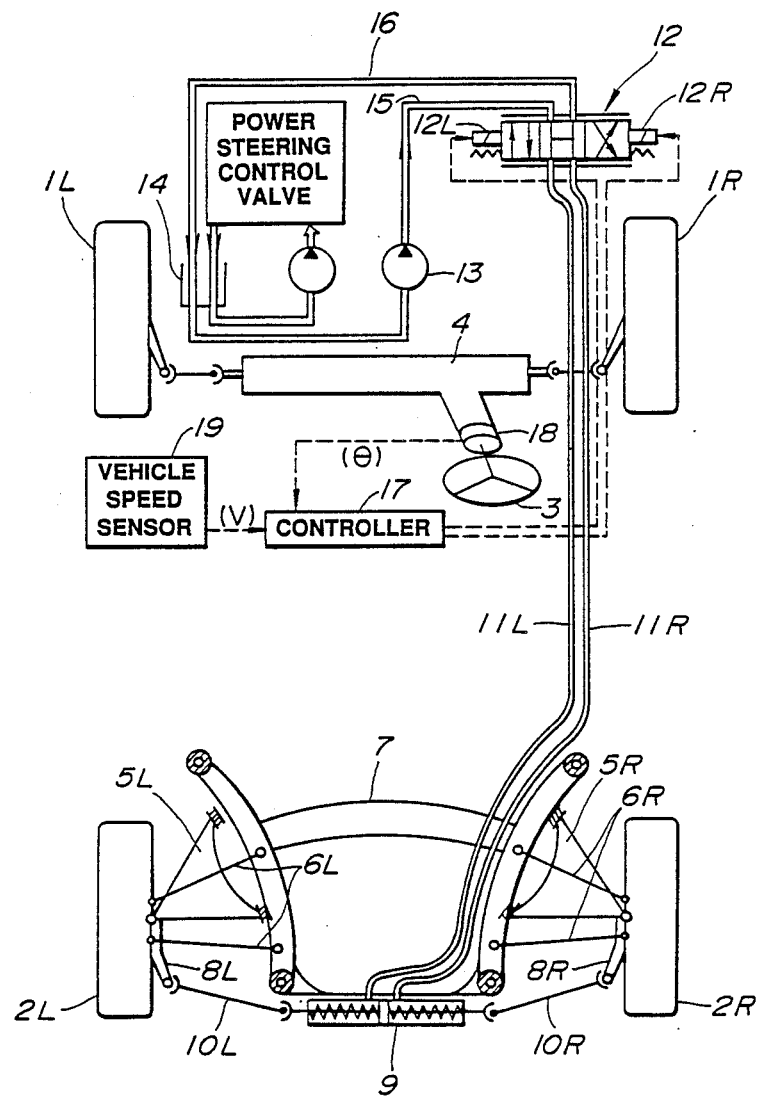
FIG. 2 is a schematic view of a 4WS vehicle for showing first, second and third embodiments of the present invention.

FIGS. 2 and 3 show a first embodiment of the present invention.

A vehicle shown in FIG. 2 includes left and right front wheels 1L and 1R, and left and right rear wheels 2L and 2R.

The front wheels 1L and 1R are connected with a steering wheel 3 through a steering gear 4. The front wheel steer angle $\delta_f$ is equal to a ratio of the steering wheel angle $\theta$ to the steering gear ratio N.

That is, $\delta_f = \theta/N$.

A rear suspension system includes left and right transverse links 5L and 5R, and left and right upper arms 6L and 6R. The rear wheels 2L and 2R are connected to a rear suspension member 7 of the vehicle body through the rear suspension member in such a manner that the rear wheels are also steerable. In order to steer the rear wheels 2L and 2R, there is provided a rear steering actuator 9, both ends of which are connected through side rods 10L and 10R with knuckle arms 8L and 8R of the left and right rear wheels 2L and 2R.

The actuator 9 of this example is a spring center type double acting hydraulic cylinder actuator. Left and right power chambers of the actuator 9 are connected to an electromagnetic proportional pressure control valve 12, respectively through left and right fluid passages 11L and 11R. The control valve 12 is connected with a pressure supply passage 15 and a drain passage 16 of a pressure source including a pump 13 and a reservoir 14. The control valve 12 of this example is a spring center type three position valve. When both of the left and right solenoids 12L and 12R of the control valve 12 are off, then the control valve 12 holds both the fluid passages 11L and 11R at a non-pressure state. When the left solenoid 12L is on, the control valve 12 supplies a fluid pressure proportional to the magnitude of the exciting current through the left passage 11L. When the right solenoid 12R is on, the control valve 12 supplies a fluid pressure proportional to the magnitude of the exciting current, through the right fluid passage 11R.

An electronic controller 17 is arranged to switch on and off the solenoids 12L and 12R, and to control the magnitude of the exciting current of each solenoid. As shown in FIG. 3, the controller 17 of this example includes a digital processing circuit 17a, a digital input detection circuit 17b, a memory circuit 17c, a D/A converter 17d, and a driver circuit 17e. The controller 17 is connected with a steering angle sensor 18 for sensing a steering angle $\theta$ and for producing a steering angle signal, and a vehicle speed sensor 19 for sensing a vehicle speed V and for producing a vehicle speed signal. In this embodiment, the steering angle sensor 18 senses the steering wheel angle $\theta$ and produces the steering angle signal representing the steering wheel angle. The steering angle signal and the vehicle speed signal are inputted into the digital processing circuit 17a through the digital input detection circuit 17b. The memory circuit 17c stores values of various constants used in the control of this embodiment. The processing circuit 17a solves the equation (11) by using the steering angle signal, the vehicle speed signal, and the values of the various constants stored in the memory circuit 17c, and produces the control signal representing a calculated rear wheel steer angle $\delta_r$. The D/A converter 17d converts the control signal from a digital form to an analog form, and the driver circuit 17e supplies a current i corresponding to the calculated rear wheel steer angle. The controller 17 determines from the steering angle $\theta$ which solenoid 12L or 12R should be energized by the current i, and produces the fluid pressure corresponding to the current i (that is, the calculated rear wheel steer angle) in the passage 11L or 11R. The actuator 9 steers the rear wheels 2L and 2R through the side rods 10L and 10R so that the actual rear wheel steer angle is made equal to the calculated rear wheel steer angle.

Figure 4:
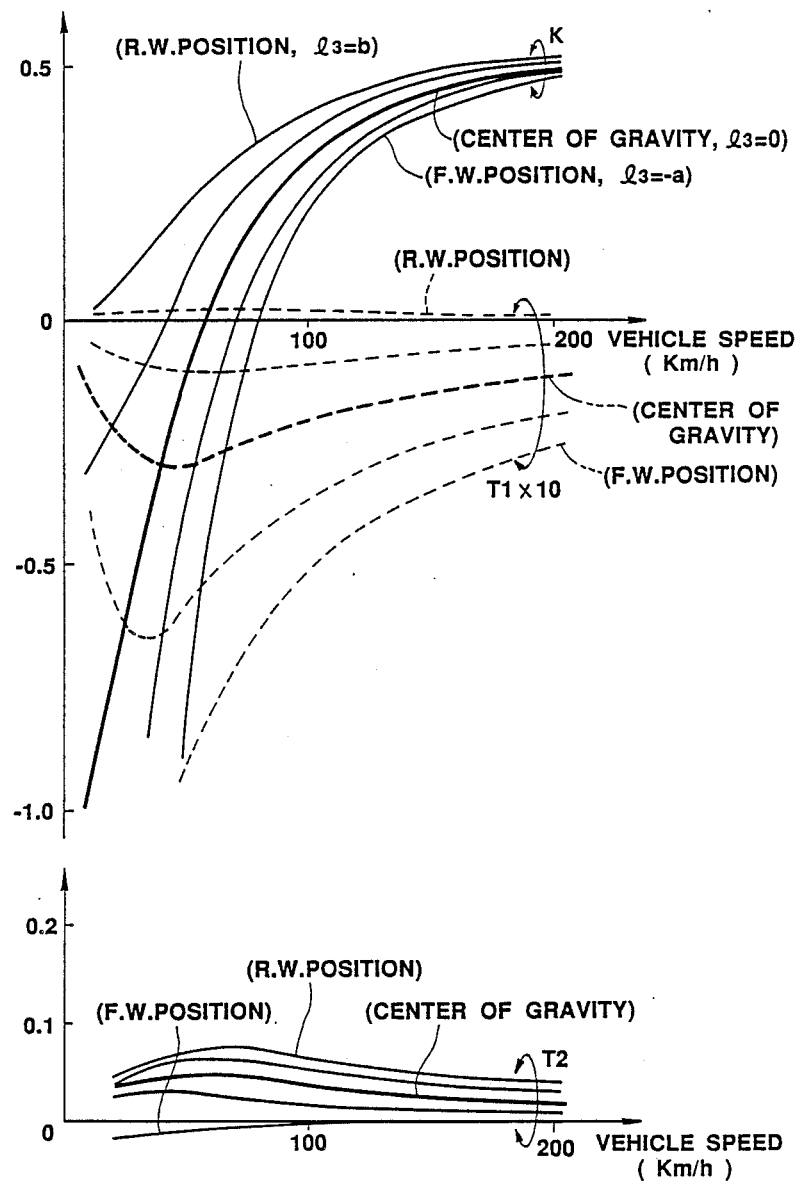
FIG. 4 is a graph showing characteristics of control parameters K, T1 and T2 used in the first embodiment.

FIG. 4 shows characteristics of the first, second and third control parameters K, T1 and T2 appearing in the equation (11), versus the vehicle speed V. In the example of FIG. 4, the control parameters K, T1 and T2 are calculated by using the specification data of an ordinary passenger car. In FIG. 4, five curved lines are shown for each of the o control parameters K, T and T2. In each group of the curved lines, the middle one shows a Characteristic obtained when the third distance $l_3$ is set equal to zero. As explained before, the third distance $l_3$ is the distance between the center of gravity g of the vehicle and the zero sideslip angle position at which the sideslip angle is equal to zero. The third distance $l_3$ is positive when the zero sideslip angle position is closer to the rear wheel position than the center of gravity g, and negative when the zero sideslip angle position is closer to the front wheel position than the center of gravity g. The middle characteristic curve of each group is obtained when the third distance $l_3$ is zero, and accordingly the zero sideslip angle position is located at the center of gravity g. In each group, the uppermost curve is obtained when the zero sideslip angle position is located at the rear wheel position, and the third distance $l_3$ is set equal to b, and the lowermost curve is obtained when the zero sideslip angle position is at the front wheel position and the third distance $l_3$ is set equal to minus a.

Figure 5:
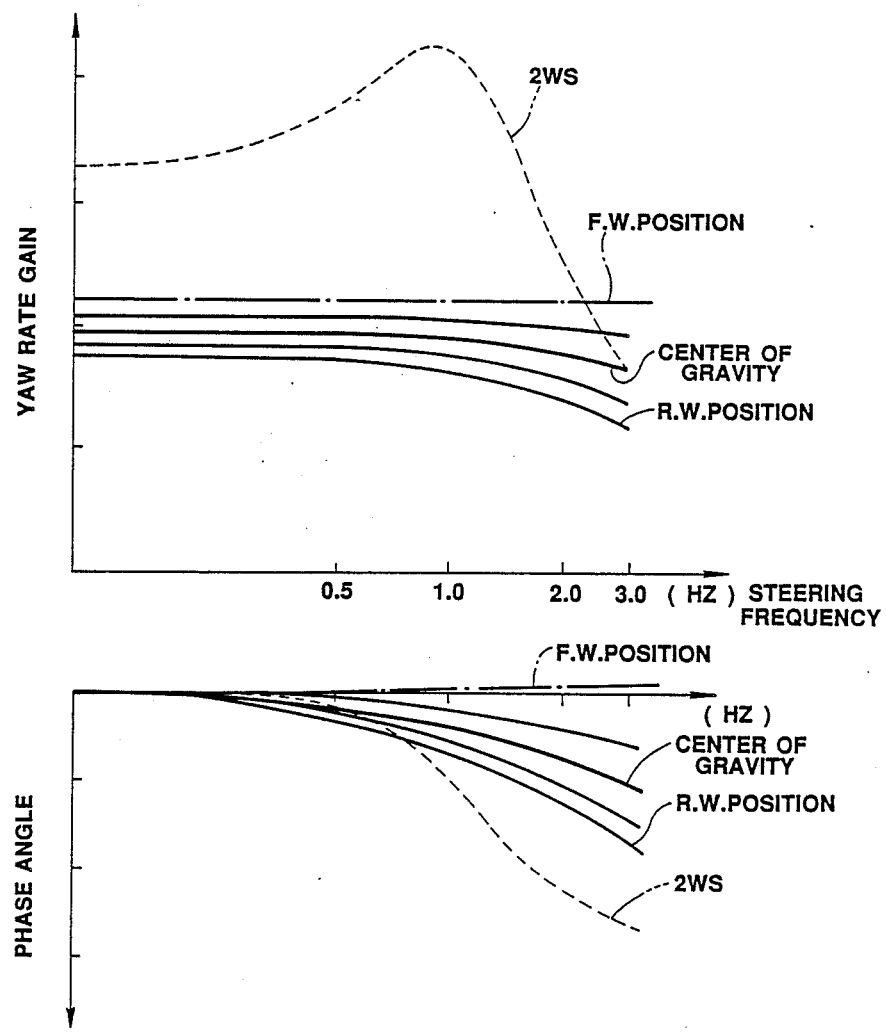
FIG. 5 is a diagram for showing frequency response characteristics of yaw rate, obtained by the rear wheel steer angle control system of the first embodiment.

FIG. 5 shows frequency response characteristics of the yaw rate. For each of the yaw rate gain (the ratio of the yaw rate to the steering wheel angle), and the phase angle, there are six curves, among which a broken line shows a characteristic of a conventional 2WS vehicle having no steer angle control, and five other curves which show characteristics of a 4WS vehicle equipped with the steer angle control system of this embodiment. As shown in FIG. 5, the 4WS vehicle equipped with the control system of the embodiment is advantageous in that the characteristic of the yaw rate gain is flat, and superior in damping of yaw.

As known from the equation (10), the transfer function of the yaw rate divided by the steering wheel angle is of a first order lag type, as distinguished from a first order lead plus second order vibration type of a conventional 2WS vehicle. Therefore, the control system of this embodiment can eliminate an overshoot of the yaw rate occurring immediately after a return of the steering wheel in a lane change operation.

Furthermore, the phase lag of the yaw rate is small, and the lowering in both the gain and phase angle in a high frequency region is small. Therefore, the control system of this embodiment can maintain a good steering response.

In the present invention, it is possible to change the dynamic characteristics of the vehicle by changing the value of the third distance $l_3$. When the zero sideslip angle position is located near the rear wheel position, then the control system can provide the vehicle characteristics which are superior in stability. When the zero sideslip angle position is located near the front wheel position, the control system can provide the vehicle characteristics which are superior in sensitivity especially at low vehicle speeds. Therefore, the present invention makes it possible to freely adjust the vehicle characteristics, and accordingly increases the flexibility in vehicle design.

It is desirable to make the third distance $l_3$ greater than minus a and smaller than b. That is, $-a<l_3<b$. When the third distance $l_3$ is greater than b ($l_3>b$), then the stability becomes excessive, and the sensitivity becomes too low. When the third distance $l_3$ is smaller than minus a ($l_3<-a$), then the stability is too low and the sensivitity is too high.

Figure 6:
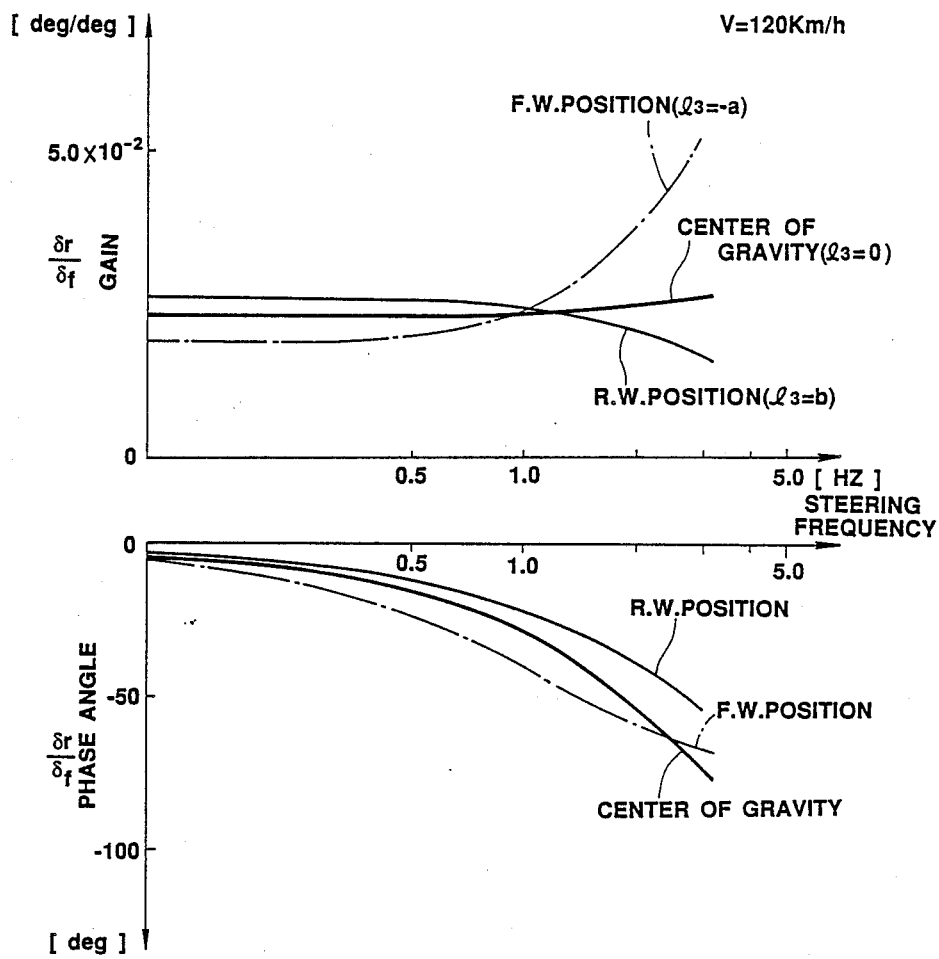
FIG. 6 is a diagram showing frequency response characteristics of $\delta_r(s)/\delta_f(s)$, obtained by the control system of the first embodiment.
Figure 7:
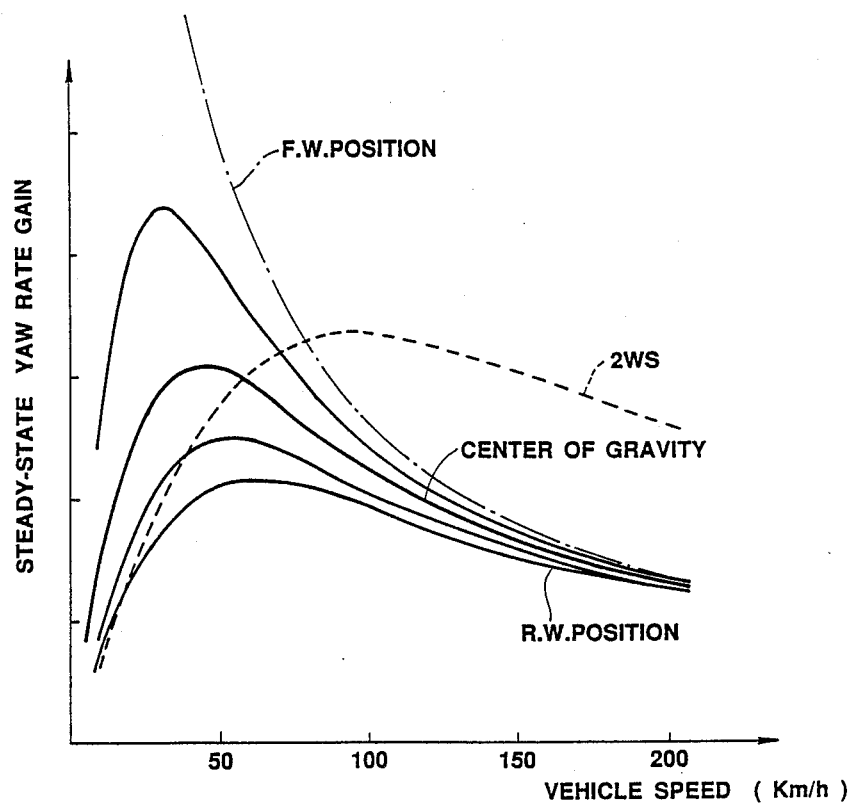
FIG. 7 is a graph showing vehicle speed dependent characteristics of the steady state yaw rate gain, obtained by the control system of the first embodiment.

FIG. 6 shows frequency characteristics of $\delta_r(s)/\delta_f(s)$ of the control system of this embodiment. FIG. 7 shows vehicle speed dependent relationships of steady-state yaw rate gain. In FIG. 7, a broken line curve shows a characteristic of a conventional 2WS vehicle, and other curves show characteristics obtained by the control system of this embodiment.

When the vehicle speed is very low, the rear wheel steer angle becomes excessive a shown in FIG. 4. Therefore, it is advisable to employ an appropriate control to determine an optimum steer angle in this speed range. For example, the characteristic of the steer angle is determined on the basis of the evaluation of feeling.

In the present invention, the transfer function of $\delta_r(s)/\delta_f(s)$ is in the form of first-order/first-order, and the rear wheel steer angle is controlled by setting the zero sideslip angle position at an approprite initial position. Therefore, the present invention can improve the vehicle steering response characteristics, and can provide an adequate vehicle stability at high speeds, and an adequate sensitivity at low speeds by choosing the value of the parameter $l_3$ appropriately.

A second embodiment of the present invention is shown in FIGS. 2, 3, 8 and 9. FIGS. 2 and 3 are common to the first and second embodiments.

Figure 8:
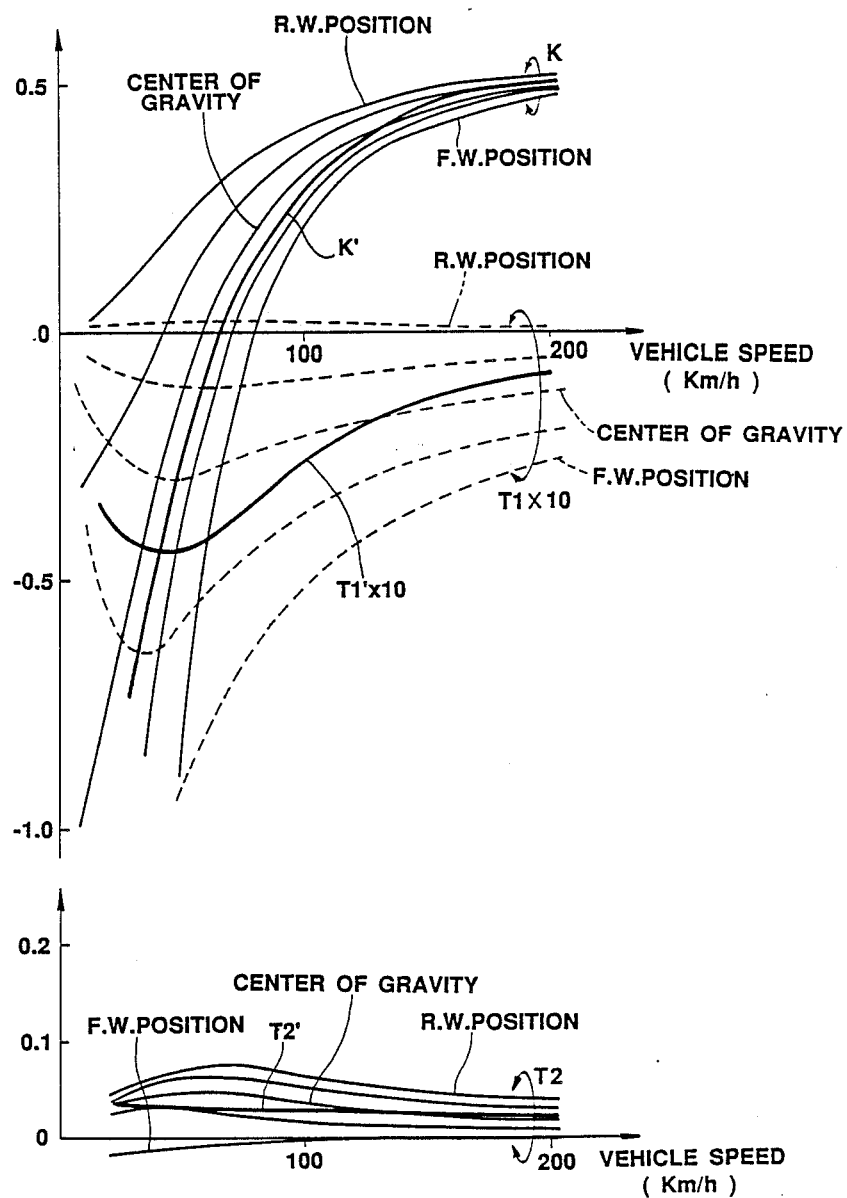
FIG. 8 is a graph showing characteristics of the control parameters K, T1 and T2 according to the second embodient of the invention.
Figure 9:
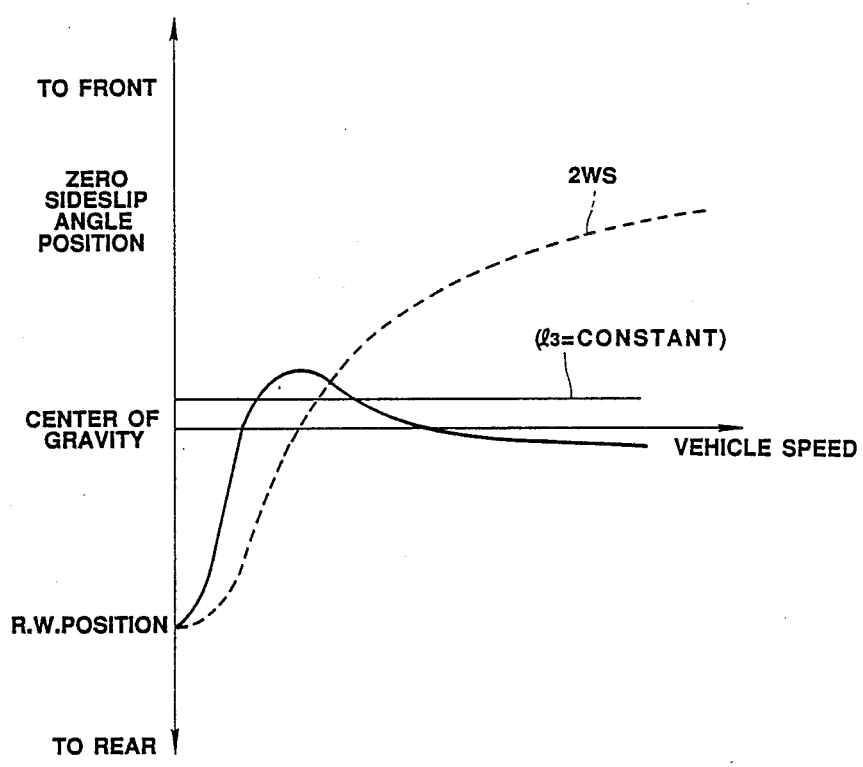
FIG. 9 is a graph showing a characteristic of a distance $l_3$ of a zero sideslip angle position from a center of gravity, used in the second embodiment.

A rear wheel steer angle control sytem of the second embodiment is almost the same in construction as the control system of the first embodiment. However, the control system of the second embodiment is arranged to adjust the value of the third distance $l_3$ of the zero sideslip angle position from the center of gravity, in accordance with the vehicle speed V. The controller 17 of the second embodiment changes the zero sideslip angle position in accordance with the vehicle speed V, as shown by a solid line curve in FIG. 9. As shown in FIG. 9, the zero sideslip angle poSition is placed ahead of the center of gravity in a predetermined low speed range in order to increase the steering sensitivity at low speeds. In order to ensure the stability, the zero sideslip angle position is moved gradually toward the rear of the vehicle as the vehicle speed V increases. In the control system of the second embodiment, the first, second and third parameters K, T1 and T2 are varied in accordance with the vehicle speed V, as shown in FIG. 8 by heavy lines indicated by K', T1'×10 and T2', respectively. In this way, the control system of the second embodiment can satisfy both of the demands for vivid vehicle response at low speeds, and handling stability at medium and high speeds.

A third embodiment of the present invention is shown in FIGS. 2, 3, 10 and 11. FIGS. 2 and 3 are common to all the first, second and third embodiments.

A rear wheel steer angle control system of the third embodiment is almost the same as the control systems of the preceding embodiments. However, the control system of the third embodiment is arranged to adjust the value of the third distance $l_3$ of the zero sideslip angle position from the center of gravity, in accordance with the steering wheel angle $\theta$ and/or the time rate of change of the steering wheel angle. In the third embodiment, the digital processing circuit 17a of the controller 17 calculates a steering angular speed $\dot{\theta}$ which is the time rate of change of the angular displacement of the steering wheel, from the steering wheel angle $\theta$ sensed by the steering angle sensor 18, and determines values of the control parameters K, T1 and T2 in accordance with current values of the steering wheel angle $\theta$, the steering angular speed $\dot{\theta}$ and the vehicle speed V. In the third embodiment, the memory circuit 17c of the controller 17 stores values of the first, second and third control parameters K, T1 and T2, which are preliminarily calculated in accordance with $\dot{\theta}$, $\theta$ and V. The values of K, T1 and T2 are stored in the form of maps or tables. The digital processing circuit 17a obtains a value of each control parameter K, T1 or T2, corresponding to $\theta$, $\dot{\theta}$ and V, from one of the maps, and determines the rear wheel steer angle by using the thus-obtained values of K, T1 and T2.

Figure 10:
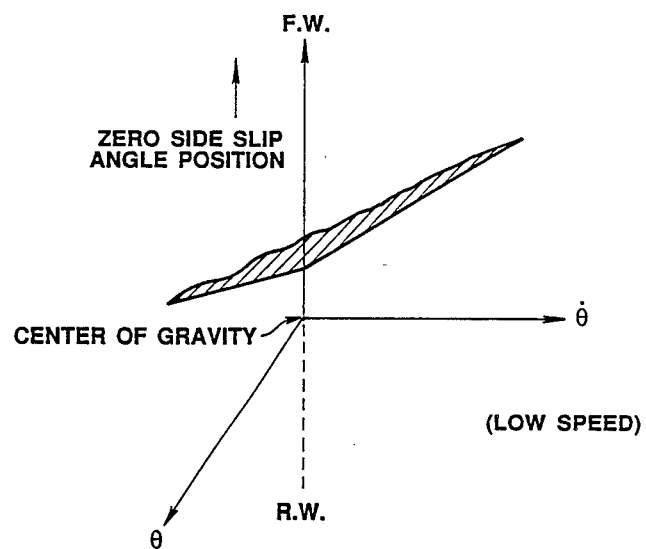
FIGS. 10 and 11 are graphs showing characteristics of the distance $l_3$ of the zero sideslip angle position, which are usable in the third embodiment.
Figure 11:
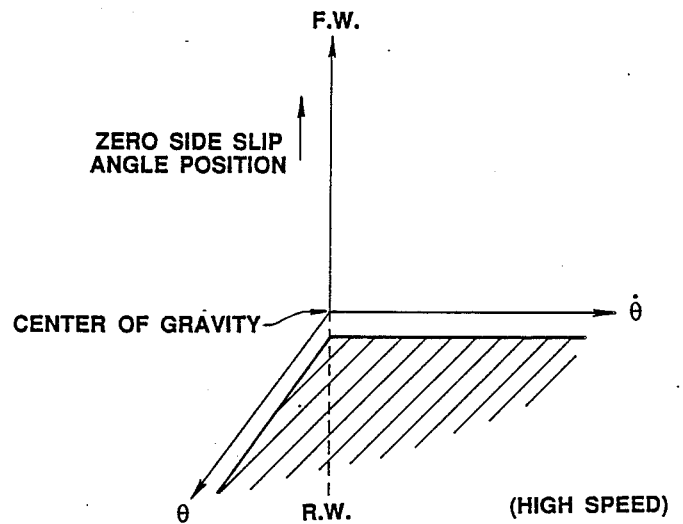
Figure 12:
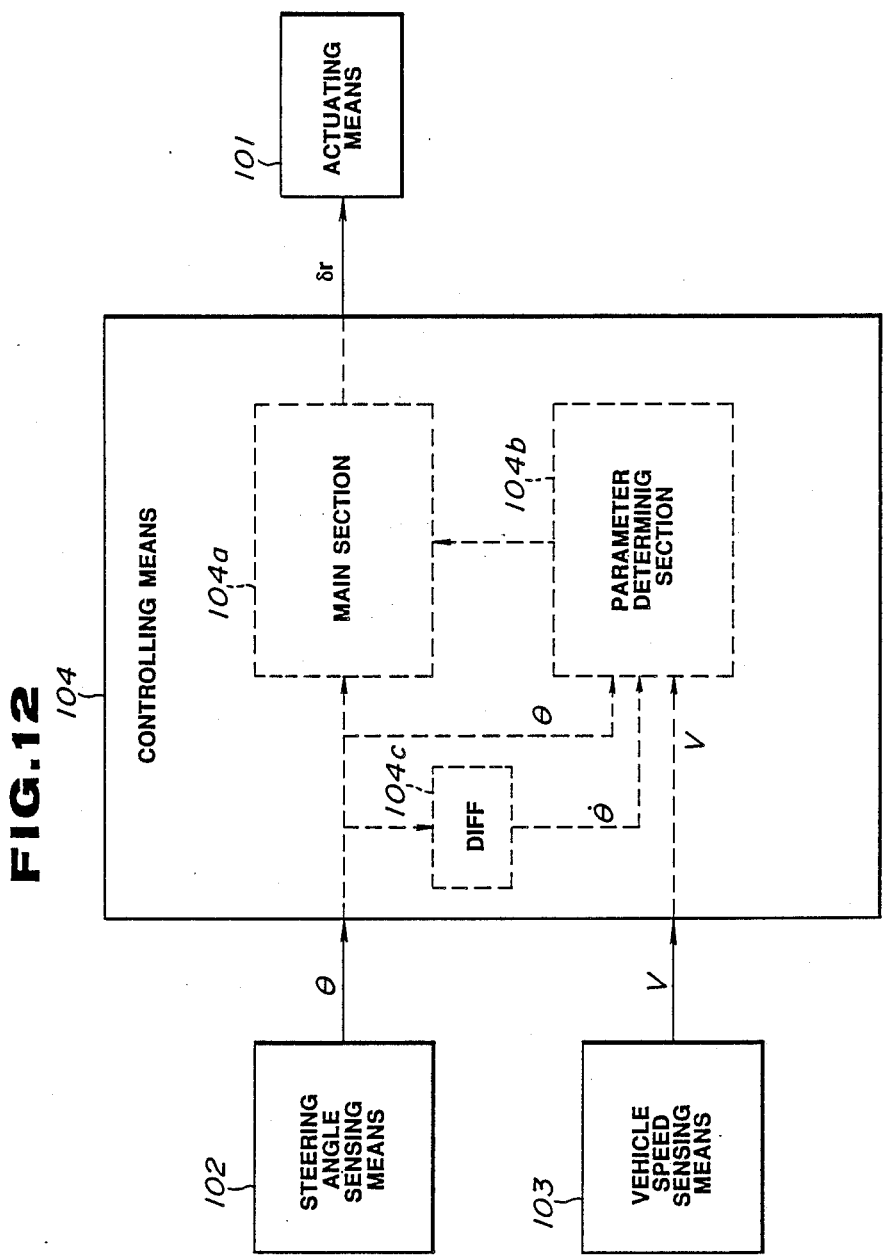
FIG. 12 is a block diagram schematically showing a basic arrangement of a control system of the invention.

When the steering wheel angle $\dot{\theta}$ and the steering angular speed $\theta$ are relatively small as in a travel along a long gradual curve, then the controller 17 of the third embodiment keeps the third distance $l_3$ within a normal range. When the steering wheel angle $\theta$ and the steering angular speed $\theta$ are increased as in a travel along consecutive sharp curves, then the controller 17 moves the zero sideslip angle position toward the front of the vehicle by decreasing the third distance $l_3$, in order to improve the controllability of the vehicle. For example, the zero sideslip angle position is displaced as shown in FIGS. 10 and 11. When the vehicle speed V is low, the zero sideslip angle position is moved toward the position of the front wheels as the steering wheel angle $\theta$ and the steering angular speed $\dot{\theta}$ increase, as shown in FIG. 10. When the vehicle speed is higher than a predetermined level, the third distance $l_3$ is fixed at a constant value irrespective of changes in $\theta$ and $\dot{\theta}$, and the zero sideslip angle position is fixed near the center of gravity, as shown in FIG. 11. Therefore, the steering stability is ensured at high vehicle speeds. The control system of the third embodiment can increase the flexibility in tuning of the control parameters to improve the sensitivity at low speeds, and improve the vehicle response characteristics (especially by providing a vivid response in yawing motion) at low speeds and in all other operating conditions.

What is claimed is:

1. A rear wheel steer angle control system for vehicle, comprising:
   (a) actuating means for steering rear wheels of the vehicle in response to a control signal;
   (b) means for sensing a steering wheel angle of the vehicle;
   (c) means for sensing a vehicle speed of the vehicle; and
   (d) controlling means connected with said steering wheel angle sensing means and said vehicle speed sensing means for controlling a rear wheel steer angle $\delta_r$ with respect to a front wheel steer angle $\delta_f$ by producing a control signal representing said rear wheel steer angle in accordance with a mathematical relationship expressed as:

$$\frac{\delta_r(s)}{\delta_f(s)} = \frac{K + T1 \cdot s}{1 + T2 \cdot s}$$

where $\delta_r(s)$ is the Laplace transform of said rear wheel steer angle $\delta_r$,
$\delta_f(s)$ is the Laplace transform of said front wheel steer angle $\delta_f$,
s is a complex variable,
K, T1, and T2 are first, second and third control parameters given by:

$$K = \frac{C_1 \{aMV^2 + C_2 l_0 (l_3 - b)\}}{C_2 \{bMV^2 + C_1 l_0 (l_3 + a)\}}$$

$$T1 = \frac{C_1 V(aMl_3 - I)}{C_2 \{bMV^2 + C_1 l_0 (l_3 + a)\}}$$

$$T2 = \frac{V(bMl_3 + I)}{bMV^2 + C_1 l_0 (l_3 + a)}$$

M is a constant representing a vehicle mass,
I is a constant representing a yawing moment of inertia,
$l_0$ is a constant representing a wheelbase,
a is a constant representing a first distance between a center of gravity of the vehicle and a front wheel position,
b is a constant representing a second distance between said center of gravity and a rear wheel position,
$l_3$ is a third distance which is a quantity representing a distance between said center of gravity and a zero sideslip angle position at which a vehicle sideslip angle is zero, and which is positive when said zero sideslip angle position is closer to said rear wheel position than said center of gravity,
$C_1$ is a constant representing a front wheel cornering power,
$C_2$ is a constant representing a rear wheel cornering power, and
V is said vehicle speed.

2. A rear wheel steer angle control system according to claim 1 wherein said controlling means comprises means for determining said rear wheel steer angle in accordance with said relationship specified by setting said third distance $l_3$ equal to a predetermined fixed value which is independent of said vehicle speed, and which is greater than minus said first distance a, and smaller than said second distance b.

3. A rear wheel steer angle control system according to claim 2 wherein said controlling means comprises parameter determining means for determining values of said first, second and third control parameters K, T1 and T2, corresponding to said vehicle speed by setting said third distance $l_3$ equal to one of said plurality of predetermined fixed values.

4. A rear wheel steer angle control system according claim 1 wherein said controlling means comprises parameter determining means for varying said third distance $l_3$ in accordance with said vehicle speed.

5. A rear wheel steer angle control system according to claim 4 wherein said parameter determining means increases said third distance $l_3$ from a negative value to a positive value as said vehicle speed increases.

6. A rear wheel steer angle control system according to claim 5 wherein said parameter determining means determines values of said first, second and third control parameters by using said third distance $l_3$ which is a function of said vehicle speed.

7. A rear wheel steer angle control system according to claim 1 wherein said controlling means comprises parameter determining means for varying said third distance $l_3$ in accordance with at least one of said steering wheel angle and a time rate of change of said steering wheel angle.

8. A rear wheel steer angle control system according to claim 7 wherein said parameter determining means decreases said third distance $l_3$ as said steering angle increases.

9. A rear wheel steer angle control system according to claim 7 wherein said parameter determining means decreases said third distance $l_3$ as said time rate of change of said steering wheel angle increases.

10. A rear wheel steer angle control system according to claim 7 wherein said controlling means comprises differentiating means for determining said time rate of change of said steering wheel angle from said steering wheel angle, and said parameter determining means decreases said third distance $l_3$ as said steering wheel angle increases and as said time rate of change of said steering wheel angle increases.

11. A rear wheel steer angle control system according to claim 10 wherein said parameter determining means fixes said third distance $l_3$ at a predetermined constant value independent of said steering wheel angle and said time rate of change of said steering wheel angle when said vehicle speed is higher than a predetermined speed.

12. A rear wheel steer angle control system according to claim 11 wherein said parameter determining means determines values of said first, second and third control parameters K, T1 and T2 in accordance with said steering wheel angle, said time rate of change of said steering wheel angle and said vehicle speed.

* * * * *